United States Patent
Kulesa et al.

(10) Patent No.: US 10,981,297 B2
(45) Date of Patent: *Apr. 20, 2021

(54) POST-CONSUMER SCRAP FILM RECYCLING SYSTEM AND PROCESS

(71) Applicant: Wisconsin Film & Bag, Inc., Shawano, WI (US)

(72) Inventors: Robert Francis Kulesa, Green Bay, WI (US); James J. Feeney, Appleton, WI (US); Richard Wayne Carlstedt, Green Bay, WI (US); Daniel William Blake, Menasha, WI (US); Buckell Gary Hacker, Shawano, WI (US); Abby Marie Johnson, Madison, WI (US)

(73) Assignee: Wisconsin Film & Bag, Inc., Shawano, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,091

(22) Filed: Apr. 25, 2016

(65) Prior Publication Data

US 2016/0236377 A1    Aug. 18, 2016

Related U.S. Application Data

(63) Continuation of application No. 14/836,007, filed on Aug. 26, 2015, now Pat. No. 9,346,192, which is a
(Continued)

(51) Int. Cl.
*B29B 17/04* (2006.01)
*B29B 17/02* (2006.01)
(Continued)

(52) U.S. Cl.
CPC .......... *B29B 17/0036* (2013.01); *B02C 23/08* (2013.01); *B02C 23/38* (2013.01);
(Continued)

(58) Field of Classification Search
CPC ..... B02C 23/08; B02C 23/38; B29B 17/0026; B29B 17/0036
(Continued)

(56) References Cited

U.S. PATENT DOCUMENTS 3,193,877 A    4/1962  Edwards
3,455,357 A    7/1969  Zink
(Continued)

FOREIGN PATENT DOCUMENTS

DE    3717839 A    12/1987
EP    2969443 B1    9/1994
(Continued)

OTHER PUBLICATIONS

Resch, M. et al. "Vermischte Und Verschmutzte Alkunstsoffe Stofflich Verwerten", Kunstoffe International, Carl Hanser Verlag, Munchen, DE, vol. 80, No. 4, Apr. 1, 1990, pp. 493-495, XP000173800, ISSN: 0023-5563, p. 494, left-hand column, para. 1.
(Continued)

*Primary Examiner* — Shelley M Self
*Assistant Examiner* — Smith Oberto Bapthelus
(74) *Attorney, Agent, or Firm* — Nelson Mullins Riley & Scarborough LLP

(57) ABSTRACT

A system and method for processing a supply of post-consumer scrap linear low density or low density polyethylene film into near-virgin quality blown film product. The method includes tearing the supply of film in a shredder, wherein the surface area of the film is exposed, including delaminating the film. The torn supply of film is washed in a water bath including a surfactant. The film is agitated in the bath containing the surfactant wherein contaminants on the film are removed from the film. The washed film is ground into smaller pieces and additional washing of the ground film in a rotating friction washer and a sink float tank occurs
(Continued)

wherein additional contaminants are removed from the film. The ground film is then dried and compacted without addition of water into granulated objects of near-virgin quality blown film product.

21 Claims, 5 Drawing Sheets

Related U.S. Application Data continuation of application No. 14/161,737, filed on Jan. 23, 2014, now Pat. No. 9,120,104, which is a continuation of application No. 14/063,045, filed on Oct. 25, 2013, now Pat. No. 9,138,749, which is a continuation-in-part of application No. 13/796,143, filed on Mar. 12, 2013, now Pat. No. 8,820,666, which is a continuation-in-part of application No. 13/024,088, filed on Feb. 9, 2011, now Pat. No. 8,567,702.

(51) Int. Cl.
    B02C 23/08 (2006.01)
    B02C 23/38 (2006.01)
    B02C 23/40 (2006.01)
    C08J 11/04 (2006.01)
    B29B 17/00 (2006.01)
    B29K 23/00 (2006.01)
    B29K 105/06 (2006.01)
    B29L 7/00 (2006.01)
    B29K 105/26 (2006.01)

(52) U.S. Cl.
    CPC .......... *B02C 23/40* (2013.01); *B29B 17/0026* (2013.01); *B29B 17/02* (2013.01); *B29B 17/04* (2013.01); *B29B 17/0412* (2013.01); *C08J 11/04* (2013.01); B29B 2017/0015 (2013.01); B29B 2017/0289 (2013.01); B29K 2023/06 (2013.01); B29K 2023/0625 (2013.01); B29K 2023/0633 (2013.01); B29K 2105/065 (2013.01); B29K 2105/26 (2013.01); B29L 2007/008 (2013.01); C08J 2323/06 (2013.01); Y02W 30/62 (2015.05)

(58) Field of Classification Search
    USPC .................................................... 241/19, 21
    See application file for complete search history.

(56) References Cited

U.S. PATENT DOCUMENTS

| | | | |
|---|---|---|---|
| 3,720,645 | A | 3/1973 | Nistri et al. |
| 4,255,295 | A | 3/1981 | Regnault et al. |
| 4,391,971 | A | 7/1983 | Massey et al. |
| 4,453,905 | A | 6/1984 | Bennett |
| 4,830,188 | A | 5/1989 | Hannigan et al. |
| 5,225,130 | A | 7/1993 | Deiringer |
| 5,236,603 | A | 8/1993 | Sampson |
| 5,257,740 | A | 11/1993 | Prew et al. |
| 5,268,074 | A | 12/1993 | Brooks et al. |
| 5,419,634 | A | 5/1995 | Bacher et al. |
| 5,540,244 | A | 7/1996 | Brooks et al. |
| 5,876,644 | A | 3/1999 | Nichols et al. |
| 5,945,460 | A | 8/1999 | Ekart et al. |
| 5,951,940 | A | 9/1999 | Nosker et al. |
| 5,977,294 | A | 11/1999 | Hoehn |
| 6,056,901 | A | 5/2000 | Hamatani et al. |
| 6,436,322 | B1 | 8/2002 | Fredl |
| 6,455,667 | B1 | 9/2002 | Kimura et al. |
| 6,607,299 | B1 | 8/2003 | Bacher et al. |
| 6,812,201 | B1 | 11/2004 | Weuthen et al. |
| 6,838,496 | B1 | 1/2005 | Goedicke et al. |
| 7,244,813 | B2 | 7/2007 | Dong et al. |
| 7,380,973 | B2 | 6/2008 | Goedicke et al. |
| 8,567,702 | B2 | 10/2013 | Kulesa et al. |
| 9,120,104 | B2 * | 9/2015 | Kulesa ................... B02C 23/08 |
| 9,138,749 | B2 * | 9/2015 | Kulesa ................... B02C 23/08 |
| 9,346,192 | B2 * | 5/2016 | Kulesa ................... B02C 23/08 |
| 1,022,725 | A1 | 7/2018 | Kulesa et al. |
| 2008/0039540 | A1 | 2/2008 | Reitz |
| 2012/0199675 | A1 * | 8/2012 | Kulesa ................ B29B 17/0026 241/15 |
| 2014/0048631 | A1 | 2/2014 | Kulesa et al. |

FOREIGN PATENT DOCUMENTS

| | | |
|---|---|---|
| EP | 0893220 A | 1/1999 |
| EP | 0893220 A2 | 1/1999 |
| EP | 1225019 | 7/2002 |
| EP | 2631051 A | 8/2013 |
| JP | H06508567 | 9/1994 |
| JP | 2002539967 | 11/2002 |
| JP | 2010241082 | 10/2010 |
| WO | WO9216686 | 10/1992 |

OTHER PUBLICATIONS

Lietz, G.: Wiederaufbereiten von PE-Folienabfallen, Kunstoffe International, Carl Hanser Verlag, Kunchen, DE, vol. 73, No. 8, Aug. 1, 1983, pp. 414-418, XP002095855, ISSN: 0023-5563, p. 416, right-hand column, para. 3, col. 2, line 5-line 6; line 65-line 66, col. 5, line1-line 2, col. 5, line 27-line 31, col. 6, line-12 line 29.
European Search Report from EP 12156681 Issued Jul. 3, 2012.
Extended European Search Report dated Sep. 21, 2016 from European Patent Office; 12 pages. EP 14 77 5159.
Notification for Reasons for Rejection for corresponding Japanese Patent Application No. 2016-500170, dated Jan. 24, 2018.
Resch, M. et al. "Vermischte Und Verschmutzte Alkunstsoffe Stoffich Verwerien", Kunstoffe International, Carl Hanser Verlag, Munchen, DE, vol. 80, No. 4, Apr. 1, 1990, pp. 493-495, XP000173800, ISSN: 0023-5563, p. 494, left-hand column, para. 1.
"Abbaubare Und Losliche Kunststoffe Eroffnen Neue Markte. Orecycle '88", Plastverarbeiter, Huethig GmbH, Heidelberg, DE, vol. 40, No. 1, Jan. 1, 1989 (Feb. 2, 1989), pp. 118/119, XP000080360, ISSN: 0032-1338, p. 119, col.2-col. 4, col. 5, line 15-line 36, figure 3.
Lietz, G.: Wiederaufbereiten von PE-Folienabfallen, Kunstoffe International, Carl Hanser Verlag, Kunchen, DE, vol. 27, No. 8, Aug. 1, 1983, pp. 414-418, XP002095855, ISSN: 0023-5563, p. 416, right-hand column, para. 3, col. 2, line 5-line 6; line 65-line 66, col. 5, line1-line 2, col. 5, line 27-line 31, col. 6, line-12 line 29.
European Search Report from EP 12156681 dated Jul. 3, 2012.
International Search Report and Written Opinion for International Application No. PCT/US2014/011850 dated May 13, 2014, 11 pages.
Mexican Office Action for Mexican Patent Application No. MX/a/2015/011162 dated Mar. 3, 2020.

* cited by examiner

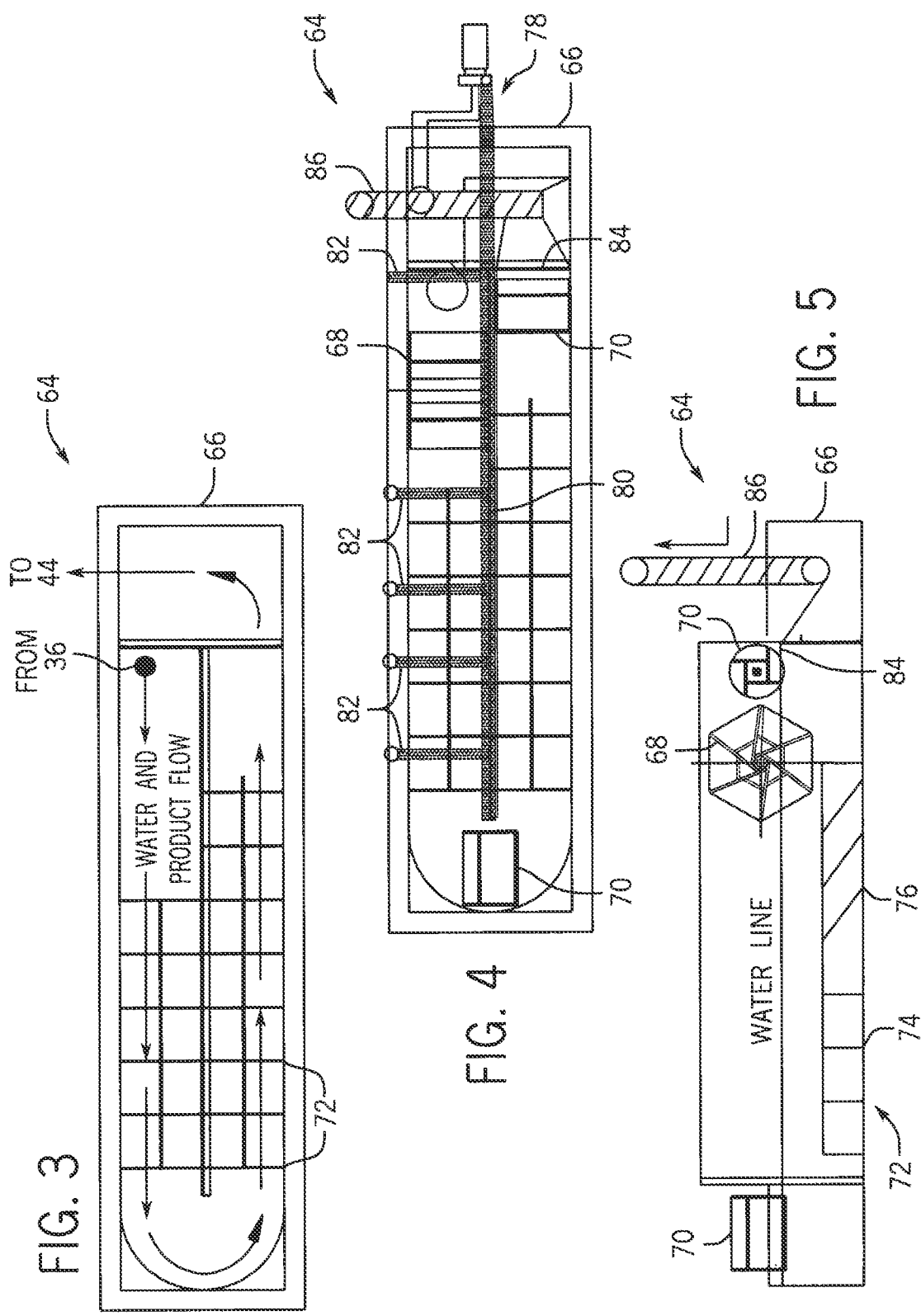

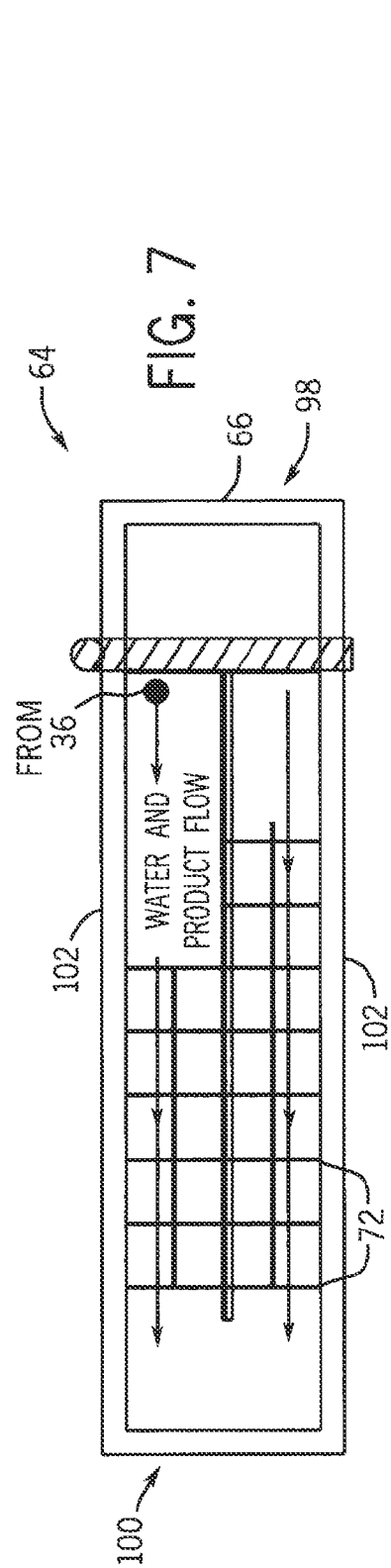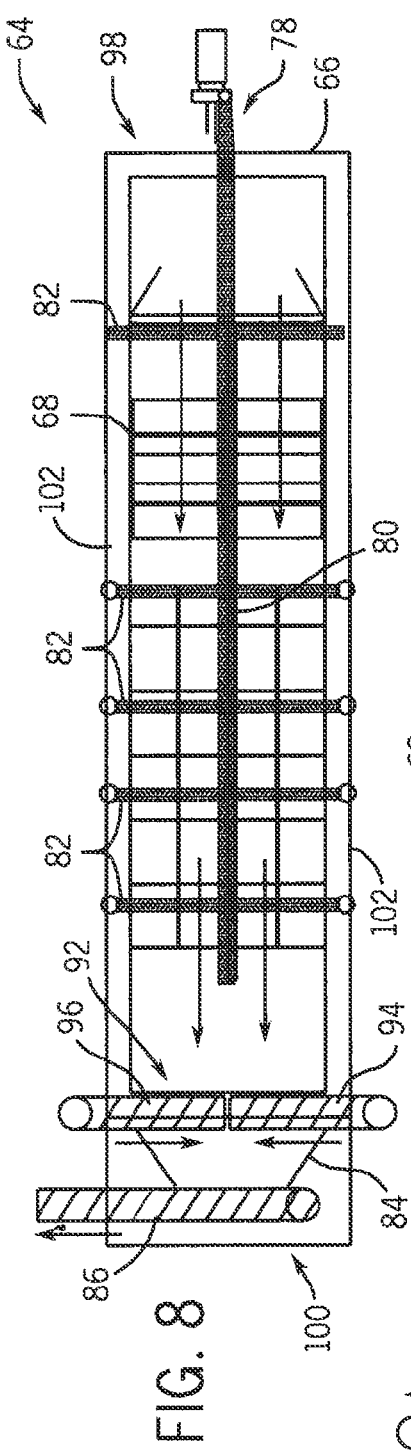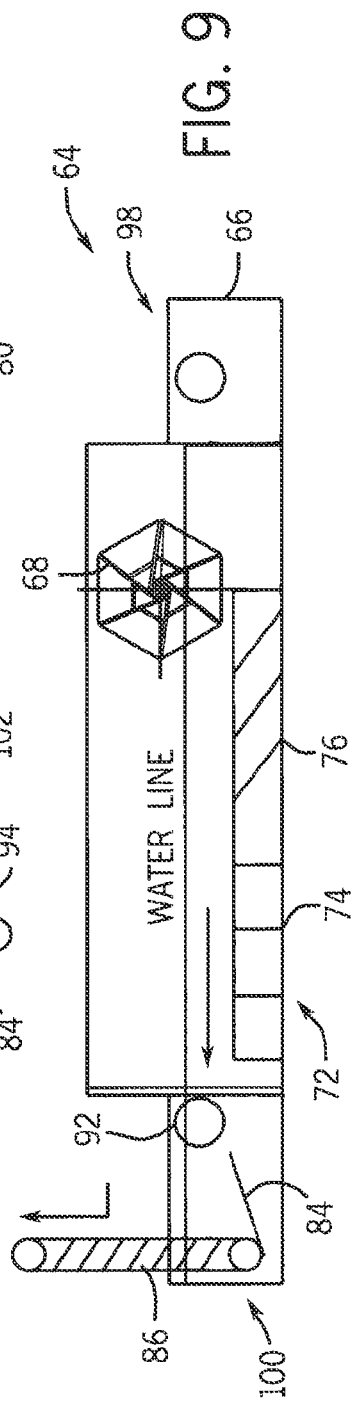

POST-CONSUMER SCRAP FILM RECYCLING SYSTEM AND PROCESS

CROSS-REFERENCE TO RELATED APPLICATIONS

This application is a continuation of U.S. patent application Ser. No. 14/836,007, filed Aug. 26, 2015, which is a continuation of U.S. patent application Ser. No. 14/161,737, filed Jan. 23, 2014, now U.S. Pat. No. 9,120,104, issued on Sep. 1, 2015, which is a continuation of U.S. patent application Ser. No. 14/063,045, filed Oct. 25, 2013, now U.S. Pat. No. 9,138,749 issued Sep. 22, 2015, which is a continuation-in-part of U.S. patent application Ser. No. 13/796,143, filed Mar. 12, 2013, now U.S. Pat. No. 8,820,666, issued Sep. 2, 2014, the latter two of which are both continuations-in-part of U.S. patent application Ser. No. 13/024,088, filed Feb. 9, 2011, now U.S. Pat. No. 8,567,702, issued on Oct. 29, 2013, all of which are entitled "Post-Consumer Scrap Film Recycling Process," all of which patent applications are assigned to the assignee of the present invention, and all of which patent applications are hereby incorporated herein by reference in their entirety.

BACKGROUND OF THE INVENTION

Field of the Invention

The present invention relates generally to a process for recycling scrap, and more particularly to a process for recycling post-consumer scrap linear low density polyethylene film and post-consumer low density polyethylene film.

Recycling of post-consumer plastic waste has received considerable publicity as being environmentally correct and "green." It is known that the majority of municipal, mixed post-consumer plastic waste includes polyethylene perephthalathe (PET) materials, such as used in soda bottles and unpigmented high density polyethylene (HDPE) materials, such as milk bottles. In a typical recycling procedure, the containers composed of PET and HDPE are separated from other waste which is then shredded into smaller pieces, cleaned, heated and extruded or granulized for reuse as other products.

One type of post-consumer scrap (PC) that has been difficult to recycle is polyethylene film. Typically, the PC film material is a "stretch wrap" linear low density polyethylene (LLDPE). Because of the strength characteristics and the stretch characteristic of the LLDPE such film is used as a baling material and wrap material for palletized loads or baling processes. Another type of PC film is low density polyethylene (LDPE) used as a wrap and as a bag.

LLDPE film is used in wrapping and securing boxes, containers, or similar items on a pallet during shipping. Upon arrival at a given destination, such PC film is removed from the palletized materials and scrapped. Such PC film typically has labels that are glued onto the outside of the film as well as various markings that are placed on the film during the shipping process. The PC film typically is wrapped around the materials on the pallets several times so that there are layers upon layers of the film.

PC film is also used to bale other scrap material. When PC film is removed from the pallets or other bales, because of the high level of contamination such as dirt, oil, biological material, layering, label adhesives, etc. the PC film is either tossed in a landfill or processed as a filler for other plastic products. Reuse of the PC film as a viable blown film product for use as industrial film or a bag product has generally not been instituted. Typically, such used film has limited use due to high level of contamination present which, in turn, causes severe processing issues as well as unpleasant properties in the finished product, for example, odor, discoloration, and "pitted" appearance.

The apparatus implementing the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present disclosure.

There is provided a system for processing a supply of post-consumer scrap linear low density polyethylene film or low density polyethylene film into near-virgin quality blown film product that includes: a shredder for shredding the supply of film, wherein the plastic film is torn and delaminated by the shredder, exposing surface area of the film; a water bath for washing the shredded film with an additive having a surfactant and agitating the shredded film in the bath, wherein contaminates are removed from the shredded film; a wet grinder for grinding the washed film; a rotating friction washer for washing the ground film to remove additional contaminates from the ground film; a postwash sink float water bath for washing the ground film and subjecting the ground film to mechanical and hydraulic agitation; a dryer for drying the washed film; and a compactor for compacting the dry, ground film, without the addition of water, into granulated objects of near-virgin quality blown film product.

In the system for processing film, the postwash sink float water bath may include: a water tank configured to hold water; at least one paddlewheel in fluid communication with the water; a baffle honeycomb in the water tank proximate the tank bottom; a water spray system coupled to the water tank and extending over the water with a plurality of spray bars configured to direct water jets into the water in the water tank; and a waterfall separator configured to move the film to a discharge auger configured to remove the film from the postwash sink float water bath.

The water tank of the postwash sink float water bath may be configured to move water in one direction from one end of the tank to another end of the tank. The plurality of spray bars of the water spray system may extend from one side of the water tank of the postwash sink float water bath to another side of the water tank of the postwash sink float water bath and may be configured to direct water jets into the water in the water tank of the postwash sink float water bath wherein the film is agitated, delaminated, and submerged.

The waterfall separator may be configured to move the film from the water tank of the postwash sink float water bath, and the waterfall separator may include a centering auger having opposite facing blades configured to move the film to a center portion of the waterfall separator accessible by the discharge auger configured to remove the film from the postwash sink float water bath.

In the system for processing film, a metal detecting conveyor may be used to detect metal in the supply of film by subjecting the supply of film to a magnetic field and the metal may be removed from the supply of film prior to shredding the supply of film in the shredder. A filter screen may be used to screen shredded plastic film that will be provided to the water bath. In the system for processing film, the dry, ground film contains not more than ten percent, by weight, water content. A granulator may be used to form the granulated objects into pellets after the compactor has compacted the dry, ground film.

The additive having a surfactant used by the system for processing film may be a detergent. The detergent may include, in addition to the surfactant, a caustic soda and a soda ash as a sodium percarbonate. The surfactant may be a nonionic surfactant, the caustic soda may be sodium hydroxide, and the soda ash may be sodium carbonate. The nonionic surfactant comprises low foaming linear alcohol alkoxylate.

The system for processing film may also include a hydrocyclone located intermediate the rotating friction washer and the postwash sink float water bath for separating at least two different types of the washed, ground film, wherein lighter, washed, ground film may be separated from heavier, washed, ground film and the lighter, washed, ground film may then be provided to the postwash sink float water bath. The system for processing film may further include a turbo washer located after the rotating friction washer and prior to the hydrocyclone for washing the ground film to provide additional cleansing of the ground film and separation of contaminants from the ground film.

There is provided a system for processing a supply of post-consumer scrap linear low density polyethylene film or low density polyethylene film into near-virgin quality blown film product that includes: a metal detector for detecting and removing metal from the supply of film; a shredder for shredding the supply of film after metal removal, wherein the plastic film is torn and delaminated by the shredder, exposing surface area of the film; a filter screen through which the shredded plastic film is discharged from the shredder to a water bath, wherein the water bath washes the shredded film with an additive having a surfactant and agitates the shredded film in the water bath to remove contaminates from the shredded film; a wet grinder for grinding the washed film; a rotating friction washer for washing the ground film to remove additional contaminates from the ground film; a hydrocyclone for separating lighter, washed, ground film from heavier, washed, ground film; a postwash sink float water bath for washing the lighter, washed, ground film and subjecting it film to mechanical and hydraulic agitation; a dryer for drying the washed film; and a compactor for compacting the dry, ground film, without the addition of water, into granulated objects of near-virgin quality blown film product.

In this system for processing film, the postwash sink float water bath may also include: a water tank configured to hold water; at least one paddlewheel in fluid communication with the water; a baffle honeycomb in the water tank proximate the tank bottom; a water spray system coupled to the water tank and extending over the water with a plurality of spray bars configured to direct water jets into the water in the water tank; and a waterfall separator configured to move the film to a discharge auger configured to remove the film from the postwash sink float water bath.

There is additionally provided a system for processing a supply of post-consumer scrap linear low density polyethylene film or low density polyethylene film into near-virgin quality blown film product that includes: a metal detector for detecting and removing metal from the supply of film; a shredder for shredding the supply of film after metal removal, wherein the plastic film is torn by the shredder, exposing surface area of the film; a filter screen through which the shredded plastic film is discharged from the shredder to a water bath, wherein the water bath agitates the shredded film in the water bath including a detergent; a wet grinder for grinding the washed film; a rotating friction washer for washing the ground film to remove contaminates from the ground film; a hydrocyclone for separating lighter, washed, ground film from heavier, washed, ground film; a postwash sink float water bath for washing the lighter, washed, ground film and subjecting it film to mechanical and hydraulic agitation; a dryer for drying the washed film so that it contains not more than ten percent, by weight, water content; a compactor for compacting the dry, ground film, without the addition of water; and a granulator that forms the granulated objects into pellets after the compactor has compacted the dry, ground film.

In this additional system for processing film, the postwash sink float water bath may also include: a water tank configured to hold water; at least one paddlewheel in fluid communication with the water; a baffle honeycomb in the water tank proximate the tank bottom; a water spray system coupled to the water tank and extending over the water with a plurality of spray bars configured to direct water jets into the water in the water tank; and a waterfall separator configured to move the film to a discharge auger configured to remove the film from the postwash sink float water bath.

This additional system for processing film may also have the water tank of the postwash sink float water bath configured to move water in one direction from one end of the tank to another end of the tank.

There is also provided a method for processing a supply of post-consumer scrap linear low density polyethylene film or low density polyethylene film into near-virgin quality blown film product. The method includes: shredding the supply of film in a shredder, wherein the plastic film is torn and delaminated, exposing surface area of the film; washing the shredded film in a water bath with an additive having a surfactant and agitating the shredded film in the bath, wherein contaminates are removed from the shredded film; grinding the washed film in a wet grinder and washing the ground film in a rotating friction washer, wherein additional contaminates are removed from the ground film; washing the ground film in a postwash sink float water bath, wherein the ground film is subjected to mechanical and hydraulic agitation in the postwash sink float water bath; drying the washed film; and compacting the dry, ground film, without the addition of water, into granulated objects of near-virgin quality blown film product.

The postwash sink float water bath may include: a water tank configured to hold water; at least one paddlewheel in fluid communication with the water; a baffle honeycomb in the water tank proximate the tank bottom; and a water spray system coupled to the water tank and extending over the water with a plurality of spray bars configured to direct water jets into the water in the water tank. The postwash sink float water bath may also include: a waterfall separator configured to move the film to a discharge auger configured to remove the film from the postwash sink float water bath.

The water tank of the postwash sink float water bath may be configured to move water in one direction from one end of the tank to another end of the tank. The plurality of spray bars of the water spray system may extend from one side of the water tank of the postwash sink float water bath to another side of the water tank of the postwash sink float water bath and may be configured to direct water jets into the water in the water tank of the postwash sink float water bath wherein the film is agitated, delaminated, and submerged. The waterfall separator may be configured to move the film from the water tank of the postwash sink float water bath, and the waterfall separator may include a centering auger having opposite facing blades configured to move the film to a center portion of the waterfall separator accessible by the discharge auger configured to remove the film from the postwash sink float water bath.

The method for processing the supply of film may also include detecting metal in the supply of film by subjecting the supply of film to a magnetic field and removing metal from the supply of film prior to shredding the supply of film in the shredder. The shredded plastic film may be discharged through a filter screen to the water bath. In the method of processing the supply of film, the dry, ground film contains not more than ten percent, by weight, water content. The granulated objects may also be formed into pellets after the compacting step.

The additive having a surfactant for washing the shredded film in the water bath may be a detergent. The detergent may include, in addition to the surfactant, a caustic soda and a soda ash as a sodium percarbonate. The surfactant may be a nonionic surfactant, the caustic soda may be sodium hydroxide, and the soda ash may be sodium carbonate. The nonionic surfactant comprises low foaming linear alcohol alkoxylate.

The method for processing the supply of film may also include, after the grinding and washing step and prior to the washing step in the postwash sink float water bath, the step of separating at least two different types of the washed, ground film in a hydrocyclone, wherein lighter, washed, ground film is separated from heavier, washed, ground film and the lighter, washed, ground film provided to the postwash sink float water bath. The method for processing the supply of film may further include, prior to washing the ground film in a rotating friction washer, the step of washing the ground film in a turbo washer to provide additional cleansing of the ground film and separation of contaminants from the ground film.

The method of processing the supply of film may utilize in at least one of the washing processes hot water having a temperature of at least 140° F. but not more than 190° F.

The apparatus to implement the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 3 is a top schematic view of an exemplary embodiment of a postwash sink tank water bath illustrating water and product flow in the tank;

FIG. 4 is a top schematic view of the postwash sink tank water bath illustrated in FIG. 3 including a mechanical and a hydraulic agitation system;

FIG. 5 is a side schematic view of the postwash sink tank water bath illustrated in FIG. 4 illustrating exemplary embodiments of paddlewheels, an auger and a baffle system components of the mechanical agitation system;

FIG. 7 is a top schematic view of an exemplary embodiment of a postwash sink tank water bath illustrating water and product flow in the tank from one end of the tank to another end of the tank in one direction;

FIG. 8 is a top schematic view of the postwash sink tank water bath illustrated in FIG. 7 including a mechanical and a hydraulic agitation system, including a plurality of spray bars across the width of the tank and a centering auger; and FIG. 9 is a side schematic view of the postwash sink tank water bath illustrated in FIG. 8 illustrating exemplary embodiments of paddlewheels, a centering auger, a discharge auger, and a baffle system components of the mechanical agitation system.

DETAILED DESCRIPTION OF THE EXEMPLARY EMBODIMENTS

There is provided a method and apparatus for recycling post-consumer scrap (PC) such as PC film which is difficult to recycle because of labels that are glued on the outside of the film as well as various markings that are placed on the film during the shipping process and other contaminates. In order to provide a viable blown film product that can be reused, the labeling, adhesives, other applied markings, and contaminates have to be removed from the PC film. It is the objective of the present disclosure to process the PC film (LLDPE and LDPE) into a near-virgin quality blown film product that can be used by itself or combined with virgin material.

For purposes of this application the term "near-virgin" shall mean a quality of the PC film compared to virgin material of blown film product. A test for such quality is a visual gel detection test. For purposes of this Application a "gel" is an unmelted portion of PC film or unmelted contaminate. In the test, the number of gels, independent of their size, is determined on a 12 inch by 12 inch square sample. Virgin material has a gel count of between 10 and 0 gels. Near-virgin material has a gel count of between 1,000 and 11 gels. The Applicants have compared a conventional PC product to a PC product produced with the method and apparatus of the present disclosure, resulting in the following:

| Film Type | Gel Count |
| --- | --- |
| Conventional PC | 52,740 |
| Present Disclosure PC | 720 |
| Virgin Material | 9 |

Figure 1:
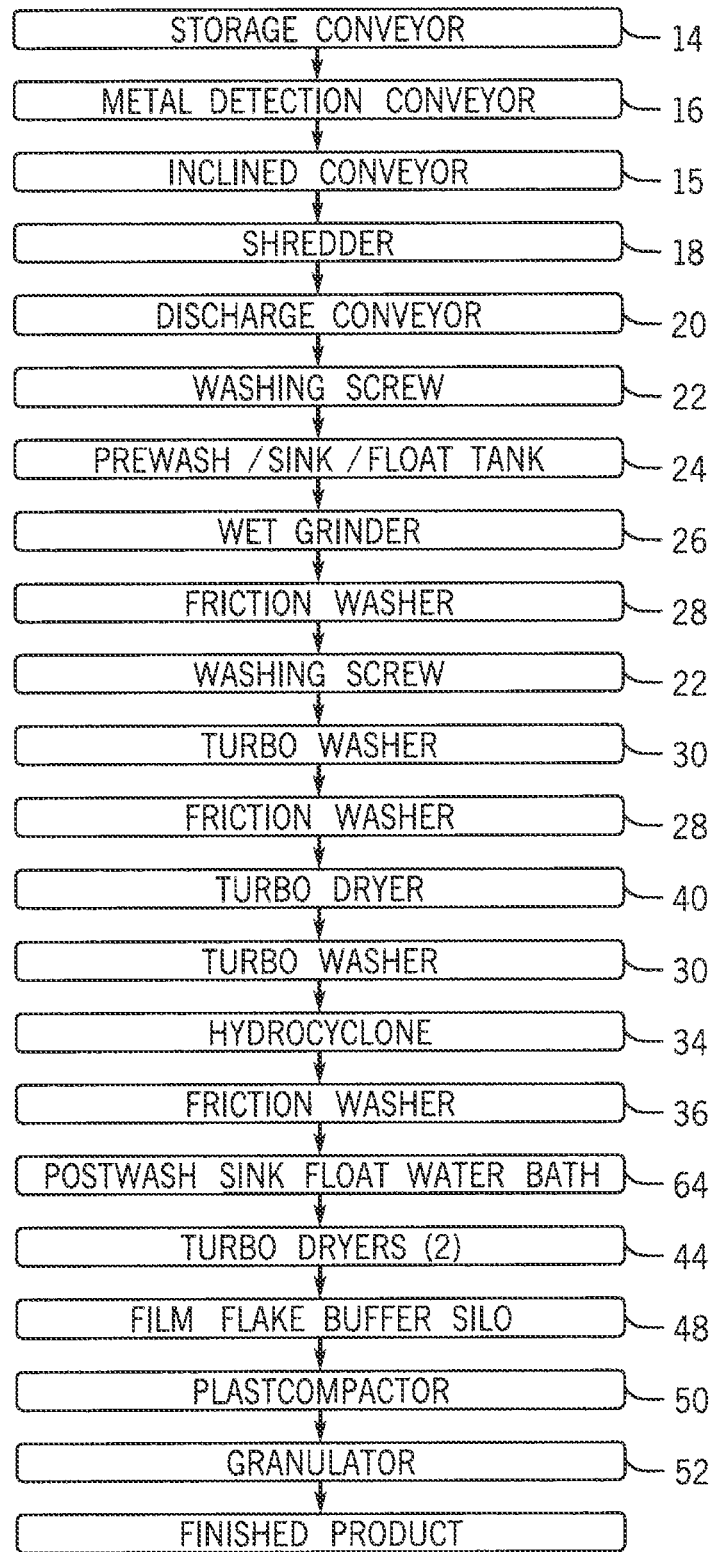
FIG. 1 is a flow chart of an exemplary embodiment of a process for recycling post-consumer scrap (PC) film.
Figure 2:
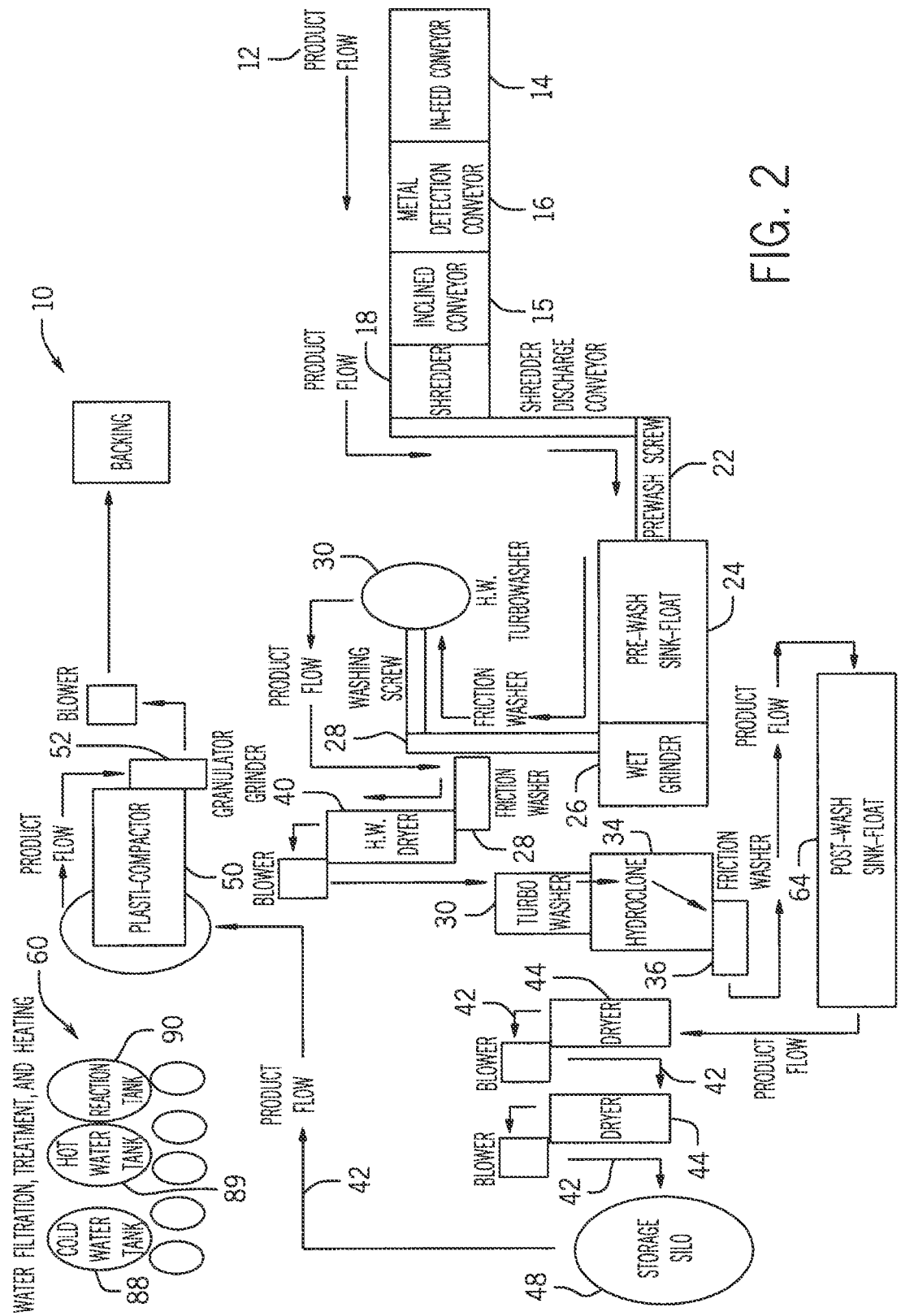
FIG. 2 is a schematic top view of an apparatus configured to process PC film in accord with the flow chart illustrated in FIG. 1.

Referring to the drawings, FIG. 1 is a flow chart of an exemplary embodiment of a process for recycling post-consumer scrap film into a near-virgin quality blown film product. FIG. 2 is a schematic top view of exemplary embodiments of an apparatus layout configured to process PC film in accord with the flow chart illustrated in FIG. 1. It should be understood that the physical layout of the equipment, as illustrated in FIG. 2, is exemplary and other configurations or equipment layouts are contemplated that can be arranged within the confines of the particular facility which utilizes the methods described herein.

A supply of post-consumer scrap linear low density polyethylene film or low density polyethylene film or a combination of LLDPE and LDPE film 12 (hereinafter "PC film") is placed on a storage conveyor 14. Placement of the supply of PC film 12 on the conveyor 14 can be by any convenient and conventional method such as a forklift, crane, hoist, and in some instances manual disposition. The storage conveyor 14 moves the supply of PC film 12 to an incline conveyor 15.

The supply of PC film 12 typically is presented in bales held together by retainer bands. In a typical operation, the retainer bands are cut and the bale is pulled apart for initial visual inspection. Such process can be done manually or by a machine as determined by the operator. If any non-film objects are initially seen in the supply of PC film 12, such objects are removed either manually or by machine.

The unbaled supply of PC film 12 is then moved by the storage conveyor 14 to a conveyor 15 through or near a metal detector 16 to facilitate removal of certain forms of metal. The metal detector 16 typically is an induction metal detector which has several forms of magnets, for example electromagnets, to detect and assist in removal of ferrous materials automatically. It is also contemplated that a series of permanent magnets within appropriate distances to the supply of PC film 12 can also be used to detect and/or remove ferrous metal objects. Other types of detectors, for example an x-ray machine, can also be used to detect non-film objects.

The incline conveyor 15 moves the supply of PC film 12 to a shredder 18, for example a Vecoplan or Wiema shredder that is configured to tear-shred the PC film into chunks and pieces and discharges the shredded film through a screen. The screen size and resultant film surface area may vary depending upon operational requirements. One example of a screen is one that has a plurality of 3-inch openings.

The shredder 18 is configured to tear the supply of PC film 12 wherein a surface area of the film is exposed. The shredder 18 also delaminates the film. Because of typical shipping wrap process, the PC film is layered one layer on top of another and the shredder 18 is configured to delaminate such layers, i.e. separate the film layers from one another. A shredder configured to cut the film, typically fuses the film layers making cleaning the film difficult, if not impossible.

The shredded supply of PC film is moved by a discharge belt 20 to a wash and transport screw 22. The wash and transport screw 22 wets the shredded film and conveys the film to a prewash/sink/float tank apparatus 24. While in the float/sink 24 apparatus, further separation of high density materials not recognized by the metal detector 16, for example stone, glass, or sand, sink to the bottom of the apparatus 24 for later removal. While in the float/sink/float tank apparatus 24 the film is further made wet by agitation, performed, for example, by a series of rotating paddles.

Additional cleaning of the PC film is accomplished, by surfactants, for example, detergents, and other compounds mixed in the tank to further clean the film of all contaminants, such as inks, adhesives, etc.

Surfactants are substances that are added to liquids to reduce the surface tension of the liquid thereby increasing the liquid's spreading and wetting properties. Surfactants are used to disperse aqueous suspensions of insoluble dyes, for example. Such additives also soften adhesives used to attach labels to the PC film. A preferred surfactant will include a detergent, an oxidizer, and a bleaching agent. It should be understood that the surfactant may include other chemicals or additives, including ionic and nonionic agents. In addition to the cleaning of the PC film, while in the sink/float tank apparatus 24, the agitation also promotes delamination of the PC film which has a tendency to stick to itself.

Detergent chemicals are added to the hot wash section of the wash line. Several individual chemicals comprise the complete detergent system; all are dosed separately so that the amounts added can be varied independently by the operator. The detergent system is phosphate free and chlorine free.

The purpose of the detergent chemicals is to facilitate the removal of various contaminants such as dirt, paper, adhesives, grease, and inks from the PC film and flake. The chemicals also aid in carrying the contaminants away from the surface of the flake before they can be redeposited.

The washing process is continuous in the system 10. The exact amount of time that the flake is exposed to the detergent chemicals is not known. It is estimated that it is only a few minutes; for this reason the concentrations of each chemical are kept at high values in order to maximize the cleaning of the PC film and flake in the shortest amount of time possible.

Figure 6:
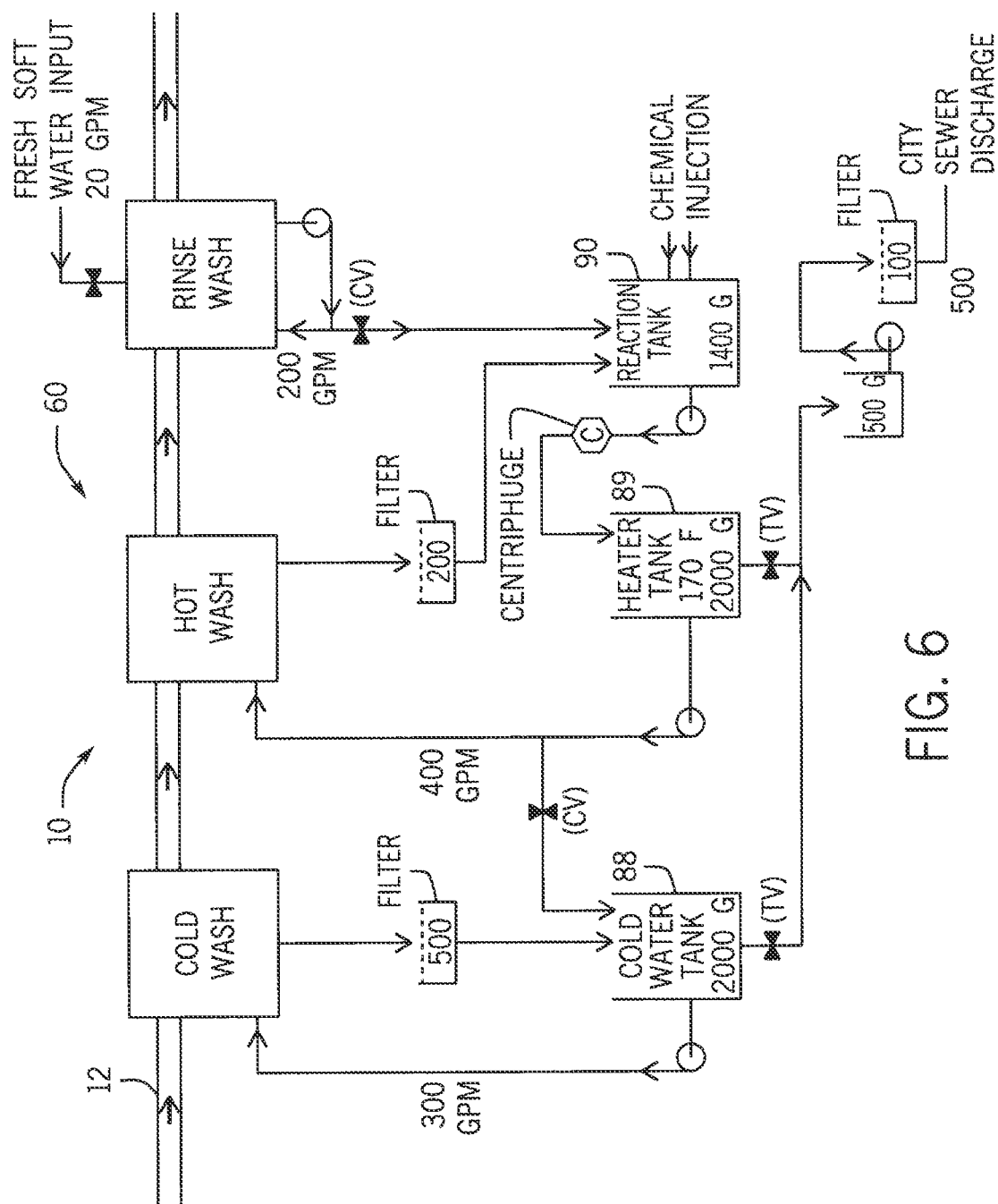
FIG. 6 is a schematic illustration of an exemplary embodiment of a water treatment apparatus coupled to the system apparatus illustrated in FIG. 2.

The detergent system consists of the following chemicals: a nonionic surfactant, caustic soda (sodium hydroxide), soda ash (sodium carbonate), and sodium percarbonate and is fully described below. The chemicals are introduced into the system 10 in the reaction tank 90 of the water treatment apparatus 60. (See FIG. 6).

The nonionic surfactant is a low foaming linear alcohol alkoxylate. The surfactant solubilizes contaminants, keeps them in suspension in the washing solution, and prevents them from redepositing onto the flake. The surfactant is added per a timed dosing pump. The concentration of the surfactant in the system is not monitored in-line as this type of monitoring is not easily achievable. Water from the system can be sampled and concentration can be determined in the laboratory using the Standard Method for the Examination of Water and Wastewater (#5540 D, Nonionic Surfactants as CTAS). Alternatively a titration can be performed such as the procedure outlined in *Anal. Chem.* 1995, 67, 1872-1880. It is expected that the concentration varies greatly due to the variation of the flake and the overall water flow in the wash line. However, based on calculations involving water usage and the dosing schedule, the concentration of surfactant in the hot wash section of the wash line is expected to remain well above the critical micelle concentration (CMC) of the surfactant, therefore a concentration sufficient to achieve cleaning is maintained.

Caustic soda is added to maintain a constant high pH value in the system. Caustic soda is added via a pump that doses per a feedback system from an in-line pH meter. It has been determined that optimal cleaning is achieved when the pH is at least 11.

Soda ash is added to maintain a high level of alkalinity in the hot wash system. Soda ash helps to break down acidic contaminants due to its high alkalinity, and it also binds remaining calcium ions that would otherwise interfere with the surfactant. Soda ash is added directly to the hot wash section of the wash line as a solid powder. The amount of soda ash in the hot wash section of the wash line is monitored using in-line conductivity meters. Soda ash is added to maintain a conductivity value of greater than 15 mS.

Sodium percarbonate is added as a bleaching agent in the wash line and helps to maintain alkalinity. The dissociation of the molecule in solution, at the elevated temperature in the hot wash section of the wash line, produces "active oxygen" (HOO—), which promotes a bleaching mechanism. Sodium percarbonate is added directly to the hot wash section of the wash line as a solid powder. Approximately equal amounts of soda ash and sodium percarbonate are used. The amount of active oxygen is not measured in the wash line, however sodium percarbonate contributes to the overall conductivity value, the monitoring and target value of which are described above.

The water throughout the wash line remains very soft, less than 5 ppm $CaCO_3$. This helps to overcome the issues that may otherwise result from the use of a phosphate-free cleaning system. It also allows for maximum effectiveness of the detergent system, especially in light of the short exposure time between the detergent and flake.

After a period of time as determined by the operator, the PC film fragments are conveyed to a first granular 26 from the sink/float tank apparatus 24. The first granular 26 further reduces in size the PC film area received from the shredder and sink/float tank 24. A typical particle size after the first granulation process is approximately three-quarters of an inch. The granulation process in the first granulator 26 also promotes further separation of wet labels from the film substrate. From the first granulator 26, the PC film is conveyed to a friction washer 28.

The granulated PC film is washed in the friction washer 28 which is configured with an inclined cylindrical trough and an incline fast running paddle screw to dewater and clean ground material discharged from the first granulator 26. The screw is fixed in the housing by means of bearings and enclosed in a stainless steel screen. The shredded and granulated material and water are fed at the lower end of the trough with the screw transporting the material upward and spinning at a speed, for example 1,000 rpms.

The granulated PC film is washed in the friction washer 28 while it is being transported to the outlet at the top of the trough. The contaminates and the water are passed through the fine stainless steel screen to the trough wall while the friction of the high speed screw further cleans the PC film. It should be understood that the friction washer 28 can be positioned in front of or after washing tanks. As illustrated in FIG. 1, the friction washer 28 is positioned after a turbo washer 30. A friction washer is also positioned after the wet grinder 26 as illustrated in FIG. 1. In FIG. 2, the turbo washer 30 is positioned after the friction washer 28.

Operation of the turbo washer 30 can be either with cold water or hot water. In the case of a hot water bath, the temperature can be in the range of 120° F. to 170° F., with the preferred temperature being a water temperature of at least 140° F. but not more than about 190° F. The hot water is used to affect additional cleaning of the PC film in the washer in addition to the rotary motion imparted to the PC film. Temperatures over 190° F. tend to distort and/or melt the PC film.

The granulated supply of PC film 12 is moved by a pump 32 to a water cyclone, also referred to as a hydrocyclone 34, such as for example a hydrocyclone produced by Herbold Meckesheim. The hydrocyclone 34 operates under water pressure from the pump 32 which moves water in a spiral to further separate contaminates from the PC film and further separate layers of the PC film by rotational forces of the moving water within the hydrocyclone 34.

The PC film leaves the hydrocyclone 34 at its upper end with the main stream of water, with any sinking material (higher density material) at the lower end. The hydrocyclone 34 operates in conjunction with the pump 32 and the turbo washer 30 to provide additional cleansing of the PC film and separation of contaminants from the PC film. The water from the hydrocyclone 34 continues to transport the contaminates to a vibrating screening apparatus 38 and a second friction washer 36.

The granulated PC film exits the friction washer 36 which at this point in the process 10 is configured as a flake. The flake is conveyed and deposited into a postwash sink float-water bath 64 in a large open top tank 66 of a predetermined length (for example 60 feet). The flake is immediately immersed in the bath and agitated using several methods, both mechanical and hydraulic. Paddlewheels 68, 70 (in some configurations an auger may be used to move the flakes in the water) force the PC film below the surface of the water to thoroughly wet the material and separate it from other flake pieces. In this water bath 64 heavier films sinks to the bottom of the tank 66 and prime product floats to the surface since polyethylene film is less dense. The film is moved along the surface of the water by current flow or in sequence to the propulsion of the paddlewheels and also by a water spray system 78. Water jets of the water spray system 78 are configured to provide sufficient force through a supply tube 80 and a plurality of spray bars 82, to assist the propelling the floating flake, and act to provide an additional separation function by driving the flakes of film under the water, separating it, which further helps rinse the product of any residue accumulated on the film from the prior wash cycles 28, 30, 36. The conveyed floating flake is then discharged from the bath to a waterfall separator 84 into a discharge auger 86 and conveying system which removes excess water and conveys the semi wet film into a pair of turbo dryers 44.

The postwash sink float water bath apparatus 64 is configured to remove any debris from the PC film (flakes) not otherwise separated from the film. The apparatus 64 also rinses the flakes of any residue that accumulated on the film from the prior wash cycles. From the last wash apparatus 34/36 the film is deposited into one end of a sink float tank 66 (see FIG. 3).

In one embodiment, the sink float tank 66 is configured to move the film, typically floating on the water surface, from one end of the tank 66 to the other end of the tank and then back. (See FIGS. 3, 4, and 5).

In another embodiment, the sink float tank 66 of the postwash sink float water bath apparatus 64 is configured to move the film, typically floating on the water surface, from one end 98 of the tank 66 to the other end 100 of the tank in one direction. (See FIGS. 7, 8, and 9).

Because the film normally tends to float on the water surface, the tank 66 is provided with agitation devices to not only move the film within the tank 66 but also to immerse and submerge the film, i.e., force the film pieces under water, throughout its migration in the tank 66. The bottom of the tank includes a baffle honeycomb 72 configured with vertical baffles 77 and angled baffles 76. The number of baffles and the angle of the angled baffle 76 are determined by the user of the apparatus 64 in light of the length of the tank 66. The angle of the baffles may be at an angle determined by the user and adjacent baffles 76 may be at different angles.

The vertical baffles 74 may be the same height or different adjacent heights. Various combinations of baffles 74, 76 may also be arranged. In a preferred configuration, the tank is 60 feet long and is open at the top.

As water is moved in the tank 66 the baffle honeycomb 72 causes turbulence in the water stream which agitates the floating flakes of film. Movement of the flakes, and the water, in the tank 66 is facilitated by a paddlewheel 68 which is in fluid communication with the water surface. The paddlewheel 68 may be an emersion paddlewheel with a substantial portion of its structure below the water line of the tank 66. In addition to the paddlewheel 68, a number of surface paddlewheels 70 are coupled to the tank 66 to assist in movement of the water and the floating flakes of film from one end 98 of the tank to the other end 100. (See FIGS. 8 and 9). Appropriate motors are coupled to the paddlewheels 68, 70. The paddlewheels 68, 70 may operate at different revolutions per minute as determined by an operator or controller.

In addition to the mechanical agitation imparted to the water and floating film, a water spray system 78 is coupled to the tank 66. (See FIG. 8). A supply tube 80 is coupled to a pump with the supply tube extending over the open tank. Spray bars 82 extend from the supply tube 80 typically, perpendicularly to the supply tube. In one embodiment the supply tube 80 extends along a centerline of the sink tank 66 with the spray bars 82 extending to each side 102 of the tank covering the full width of the tank. In another embodiment, the supply tube 80 extends along one side of the tank 66 and the spray bars 82 extend from the supply tube the full width of the tank 66.

The spray bars 82 are configured with spray nozzles that jet the water from the supply tube 80 with a force sufficient to move the flakes of film within the tank but also to drive the flakes of film under water which facilitates additional separation, delamination, and rinsing of any residues accumulated on the film flakes. Such hydraulic agitation assists the mechanical agitation described above to more fully rinse and cleanse and separate the film flakes.

In one embodiment, at one end of the float tank 66, a waterfall separator 84 facilitates movement of the film flakes to a discharge auger 86. (See FIGS. 4 and 5). The auger 86 moves the film flakes to the dryer stations 44 to continue in the system 10.

In another embodiment, the waterfall separator 84 includes a centering auger 92. The waterfall separator 84 discharges the film flakes to the centering auger 92. The centering auger 92 rotates (coupled to a suitable motor) and is configured with opposite facing (left hand 94 and right hand 96) screw blade portions. As the centering auger 92 rotates, the film flakes are moved toward a center portion 85 of the waterfall separator 84 to the discharge auger 86. (See FIGS. 8 and 9) The auger 86 moves the film flakes to the dry station 44 to continue in the system 10.

Upon exiting the postwash sink float water bath 64, the PC film is deposited in a first turbo dryer 44. The turbo dryer 44 removes moisture from the PC film and through a pneumatic transport system 42 deposits the PC film in a second turbo dryer 44. The second turbo dryer 44 removes additional moisture from the PC film. The PC film now is typically in the form of separate flakes and is then deposited in a film flake buffer silo 48.

Additional drying may be performed in a thermal drying apparatus which uses heat to remove additional moisture from the PC flakes. A series of pneumatic transport tubes and system 42 interconnect the first turbo dryer, the second turbo dryer, the thermal drying apparatus (if included), and a film flake buffer silo 48. It should be understood that additional turbo dryer and thermal drying apparatuses can be installed in the system and coupled to pneumatic transport tubes.

From the film flake buffer silo 48, a pneumatic transport system tube 42 moves the PC film flakes to a plastcompactor apparatus 50, which may be any commercially available such device. In one such plastcompactor, the plastcompactor 50 operates with a rotating and a fixed compaction disk with both disks configured with a screw-fitted and replaceable kneading rails. The PC film is conveyed continuously from the feed silo 48 through the center of the fixed disk into the processing area of the plastcompactor 50 by means of a feed screw. The material is rapidly heated up by the friction against and between the compactor disks. During the operation in the plastcompactor apparatus, the PC material is warmed up because of friction and starts to soften. The PC surfaces start to fuse resulting in worm-shaped formations. The additional heating in the plastcompactor 50 further reduces moisture in the PC film. In a typical operation of the methods described herein, the PC film has a moisture content of not more than 10% by weight.

From the plastcompactor apparatus 50 the worm-shaped formations are moved to a second granulator 52 which reduces the worm-shaped formations to the required agglomerated granulated object size. The specific size of the agglomerated PC film is selected by changing a screen inside the second granulator 52. The plastcompactor apparatus 50 further removes any additional moisture from the PC film and compacts the dry ground film, without addition of water, into the granulated objects of near-virgin quality blown film product.

In one embodiment of the method, a controller is used to control the various functions of the apparatus including water temperatures, air pressures time periods, a specific machine granular size, and speed of operation.

The controller may be a microprocessor coupled to the various apparatus of the system. The controller may also be a server coupled to an array of peripherals or a desktop computer, or a laptop computer, or a smart-phone. It is also contemplated that the controller is configured to control each individual machine and may be remote from any of the apparatus. Communication between the controller and the various apparatus may be either by hardwire or wireless devices. A memory/data base coupled to the controller may be remote from the controller. The controller typically includes an input device, for example a mouse, or a keyboard, and a display device, for example a monitor screen or a smart phone. Such devices can be hardwired to the controller or connected wirelessly with appropriate software, firmware, and hardware. The display device may also include a printer coupled to the controller. The display device may be configured to mail or fax reports as determined by a user. The controller may be coupled to a network, for example, a local area network or a wide area network, which can be one of a hardwire network and a wireless network, for example a Bluetooth network or internet network, for example, by a WI-FI connection or "cloud" connection.

In another embodiment a water treatment apparatus 60 is coupled to the various wash apparatus to recycle and filter the water used within the system for continued use. The quality of the water will vary at various stages of the process, with the recycling and filtering of the water controlled by the operator and/or in conjunction with the controller. An exemplary embodiment of a water treatment apparatus 60 is illustrated in the schematic shown in FIG. 6.

In a further embodiment, one or more testing stations are installed to test the quality of the PC film being processed. One such test is the "gel count" test described above; however, other appropriate tests can be implemented as determined by the operator, for example a pH test and testing by soft water test stations. The test stations can be coupled to the controller to automatically monitor, test and report results by configuring the controller. Testing is typically performed at various stages of the process as determined by the operator.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present process and apparatus has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the process and apparatus as described herein may be made, none of which depart from the spirit or scope of the present disclosure. The particular embodiments and applications were chosen and described to provide the best illustration of the principles of the process and its practical application to thereby enable one of ordinary skill in the art to utilize the process and apparatus in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for processing a supply of post-consumer scrap comprising one or more of linear low density polyethylene or low density polyethylene plastic film, comprising:
    a metal detecting conveyor for detecting metal in the supply of film by subjecting the supply of film to a magnetic field and removing metal from the supply of film prior to shredding the supply of film in the shredder;
    a shredder configured to tear and delaminate the supply of film, wherein surface area of the film is exposed;
    a water bath configured to wash the shredded film with an additive having a surfactant;
    a wet grinder configured to grind the washed film;
    a friction washer for washing the ground film to remove additional contaminates from the ground film; wherein at least one of the water bath or the friction washer contains hot water;
    a postwash sink float water bath configured to wash the ground film and to immerse and submerge the ground film in water;
    a dryer for drying the washed film; and
    a compactor configured to process the dry, washed film into granulated objects of near-virgin quality blown film product.

2. The system of claim 1, wherein the additive comprises, in addition to the surfactant, a caustic soda and a soda ash as a sodium percarbonate.

3. The system of claim 2, wherein the surfactant comprises a nonionic surfactant, the caustic soda comprises sodium hydroxide, and the soda ash comprises sodium carbonate.

4. The system of claim 3 wherein the nonionic surfactant comprises linear alcohol alkoxylate.

5. The system of claim 1, wherein the postwash sink float water bath comprises:
    a water tank configured to hold water;
    at least one paddlewheel in fluid communication with the water;
    a baffle honeycomb in the water tank proximate the tank bottom;
    a water spray system coupled to the water tank and extending over the water with a plurality of spray bars configured to direct water jets into the water in the water tank; and
    a waterfall separator configured to move the film to a discharge auger configured to remove the film from the postwash sink float water bath.

6. The system of claim 5, wherein the water tank of the postwash sink float water bath is configured to move water in one direction from one end of the tank to another end of the tank.

7. The system of claim 5, wherein the plurality of spray bars of the water spray system extend from one side of the water tank of the postwash sink float water bath to another side of the water tank of the postwash sink float water bath and are configured to direct water jets into the water in the water tank of the postwash sink float water bath wherein the film is agitated, delaminated, and submerged.

8. The system of claim 5, wherein the waterfall separator is configured to move the film from the water tank of the postwash sink float water bath, and wherein the waterfall separator includes a centering auger having opposite facing blades configured to move the film to a center portion of the waterfall separator accessible by the discharge auger configured to remove the film from the postwash sink float water bath.

9. The system of claim 1, additionally comprising:
    a washer located after the rotating friction washer and prior to the hydrocyclone for washing the ground film to provide additional cleansing of the ground film and separation of contaminants from the ground film.

10. The system of claim 1, wherein the dry, washed film contains not more than ten percent, by weight, water content.

11. The system of claim 1, further comprising: a granulator that forms the granulated objects into pellets after the compactor has compacted the dry, washed film.

12. A method for processing a supply of post-consumer scrap plastic film into near-virgin quality blown film product, comprising:
  detecting metal from the supply of film and removing detected metal from the supply of film;
  tearing and delaminating the supply of film in a shredder, wherein surface area of the film is exposed;
  washing the torn film in a water bath with an additive having a surfactant and agitating the shredded film in the bath to remove contaminates therefrom;
  grinding the washed film and washing the ground film in a friction washer to remove additional contaminates from the ground film; wherein at least one of the water bath or the friction washer contains hot water;
  washing the film in a postwash sink float water bath, including by immersing and submerging the film;
  drying the washed film; and
  compacting the dry, washed film into granulated objects of near-virgin quality blown film product.

13. The method of claim 12, wherein the dry ground plastic film contains not more than ten percent, by weight, water content.

14. The method of claim 12, further comprising forming the granulated objects into pellets after the compacting step.

15. The method of claim 12, wherein the additive comprises, in addition to the surfactant, a caustic soda and a soda ash as a sodium percarbonate.

16. The method of claim 12, wherein the postwash sink float water bath comprises:
  a water tank configured to hold water;
  at least one paddlewheel in fluid communication with the water;
  a baffle honeycomb in the water tank proximate the tank bottom;
  a water spray system coupled to the water tank and extending over the water with a plurality of spray bars configured to direct water jets into the water in the water tank; and
  a waterfall separator configured to move the film to a discharge auger configured to remove the film from 1 the postwash sink float water bath.

17. The method of claim 16, wherein the water tank of the postwash sink float water bath is configured to move water in one direction from one end of the tank to another end of the tank.

18. The method of claim 16, wherein the plurality of spray bars of the water spray system extend from one side of the water tank of the postwash sink float water bath to another side of the sink float water bath and water tank of the postwash are configured to direct water jets into the water in the water tank of the postwash sink float water bath wherein the film is agitated, delaminated, and submerged.

19. The method of claim 16, wherein the waterfall separator is configured to move the film from the water tank of the postwash sink float water bath, and wherein the waterfall separator includes a centering auger having opposite facing blades configured to move the film to a center portion of the waterfall separator accessible by the discharge auger configured to remove the film from the postwash sink float water bath.

20. The method of claim 12, additionally comprising:
  separating at least two different types of the ground film with a hydrocyclone located intermediate the friction washer and the postwash sink float water bath, wherein lighter, ground film is separated from heavier, ground film and the lighter ground film is provided to the postwash sink float water bath.

21. The method of claim 12, additionally comprising:
  washing the ground film in a washer located after the rotating friction washer and prior to the hydrocyclone to provide additional cleansing of the ground film and separation of contaminants from the ground film.

\* \* \* \* \*